US006796200B2

(12) United States Patent
Kelly

(10) Patent No.: US 6,796,200 B2
(45) Date of Patent: Sep. 28, 2004

(54) MULTI SPEED BICYCLE TRANSMISSION INCLUDING ECCENTRIC CRANKING ASSEMBLY

(76) Inventor: John Robert Kelly, Anini Vista Dr., Kilauea, Kauai, HI (US) 96754

( * ) Notice: Subject to any disclaimer, the term of this patent is extended or adjusted under 35 U.S.C. 154(b) by 0 days.

(21) Appl. No.: 10/173,302

(22) Filed: Jun. 18, 2002

(65) Prior Publication Data

US 2003/0230157 A1 Dec. 18, 2003

(51) Int. Cl.[7] .............................. F16H 3/52; F16H 3/64; G05G 1/14
(52) U.S. Cl. ..................... 74/349; 74/594.2; 74/594.3
(58) Field of Search .......................... 74/349, 359, 373, 74/375, 473.16, 478, 478.5, 560, 562, 594, 594.2, 594.3, 594.4, 594.7, 594.1

(56) References Cited

U.S. PATENT DOCUMENTS

| | | |
|---|---|---|
| 222,779 A | 12/1879 | Gilbert |
| 283,697 A | 8/1883 | Branham |
| 397,144 A | 2/1889 | Sams |
| 573,285 A | 12/1896 | Pfautz |
| 628,184 A | 7/1899 | Plass |
| 668,784 A | 2/1901 | Travis |
| 881,729 A | 3/1908 | Smith |
| 1,332,709 A | 3/1920 | Chrobak |
| 1,938,157 A | 12/1933 | Sperry |
| 2,210,221 A * | 8/1940 | Sperry ...................... 74/349 X |
| 2,518,537 A | 8/1950 | Frenchik |
| 2,687,897 A | 8/1954 | Wells |
| 3,209,609 A * | 10/1965 | Kirschmann ................. 74/349 |
| 3,885,473 A * | 5/1975 | Stratienko .................... 74/349 |
| 4,077,648 A | 3/1978 | Seul |
| 4,183,256 A * | 1/1980 | Lee ............................. 74/349 |
| 4,960,013 A * | 10/1990 | Sander ...................... 74/594.3 |
| 5,002,296 A | 3/1991 | Chiu |
| 5,095,772 A * | 3/1992 | Fortson ..................... 74/594.3 |
| 5,207,119 A * | 5/1993 | Garneau .................... 74/594.3 |
| 6,186,017 B1 * | 2/2001 | Kang et al. ................. 74/349 |
| 6,487,933 B2 * | 12/2002 | Orioli et al. ............... 74/594.3 |

FOREIGN PATENT DOCUMENTS

| | | | |
|---|---|---|---|
| DE | 73199 | 1/1894 | |
| FR | 541261 | 7/1922 | |
| FR | 2562497 | * 10/1985 | ............... 74/594.2 |
| GB | 25975 | of 1899 | |
| JP | 352021560 | * 2/1977 | ................. 74/349 |

* cited by examiner

*Primary Examiner*—Ha Ho
(74) *Attorney, Agent, or Firm*—Burns, Doane, Swecker & Mathis, L.L.P.

(57) ABSTRACT

A bicycle transmission has a plurality of cone gears with multiple gear surfaces and a corresponding plurality of ratio-change assemblies for selecting one of the gear surfaces of each cone gear. One cone gear provides reductions of the input rotary speed while the other cone gears provide increases in the input rotary speed. The ratio-change assemblies include apparatus for moving its gear surface both vertically and horizontally. The transmission includes a telescopic pedal arm assembly for input power and torque. The telescopic pedal arm is driven between an extended position and a retracted position during each revolution so that the available torque increases in conjunction with available leg power.

7 Claims, 9 Drawing Sheets

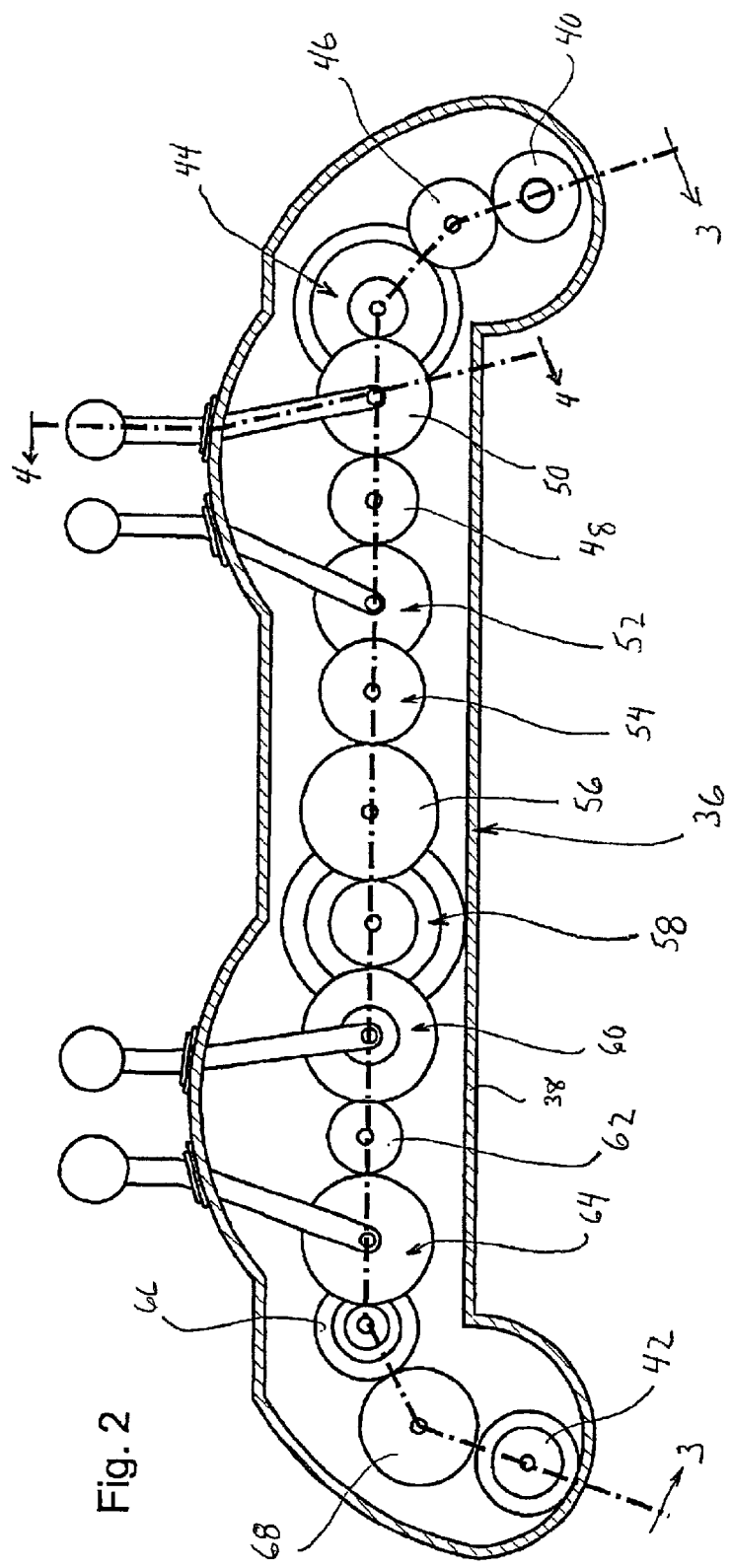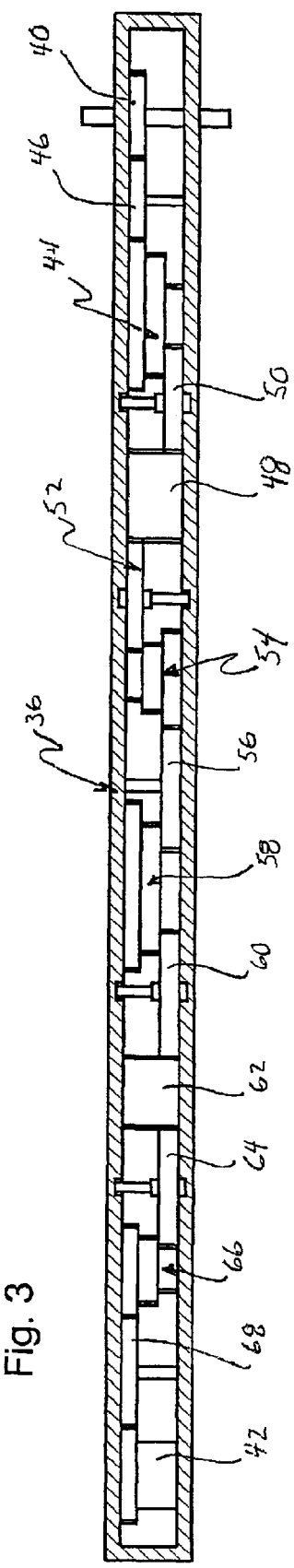

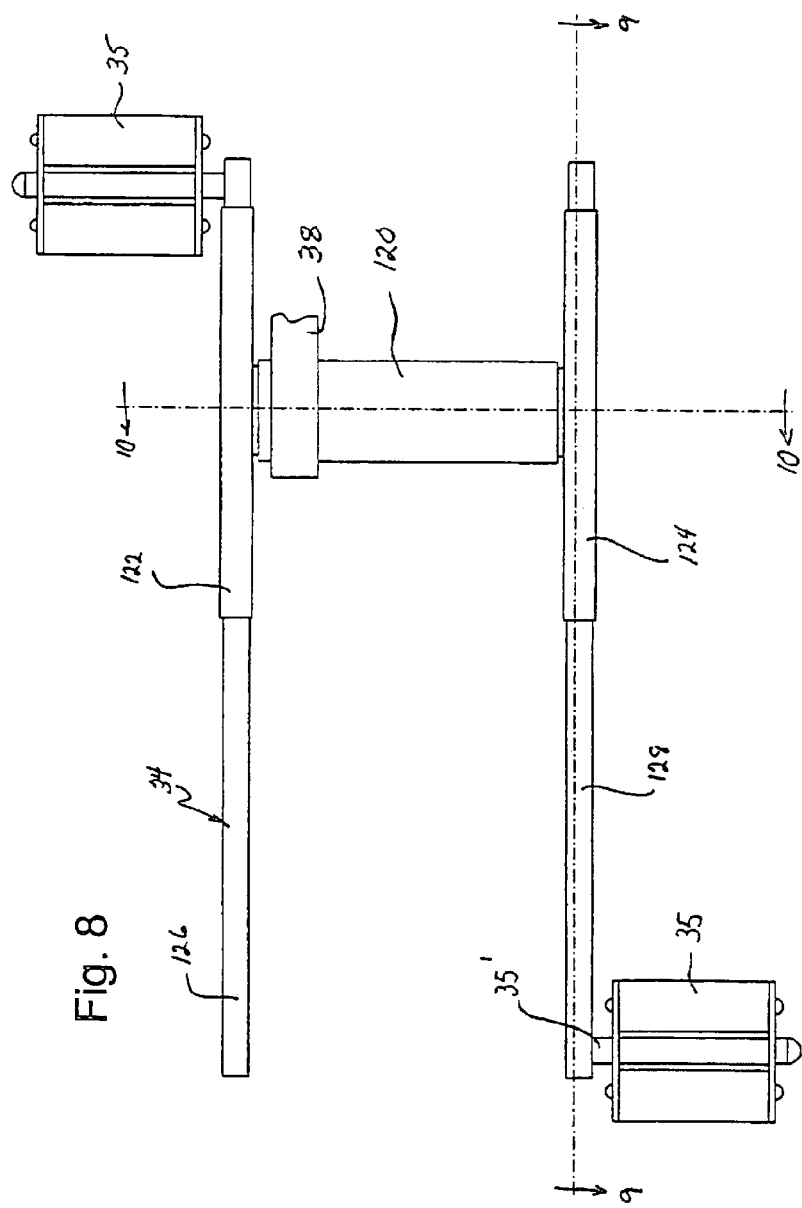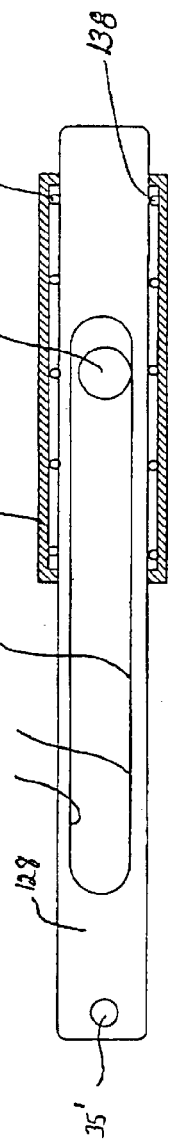

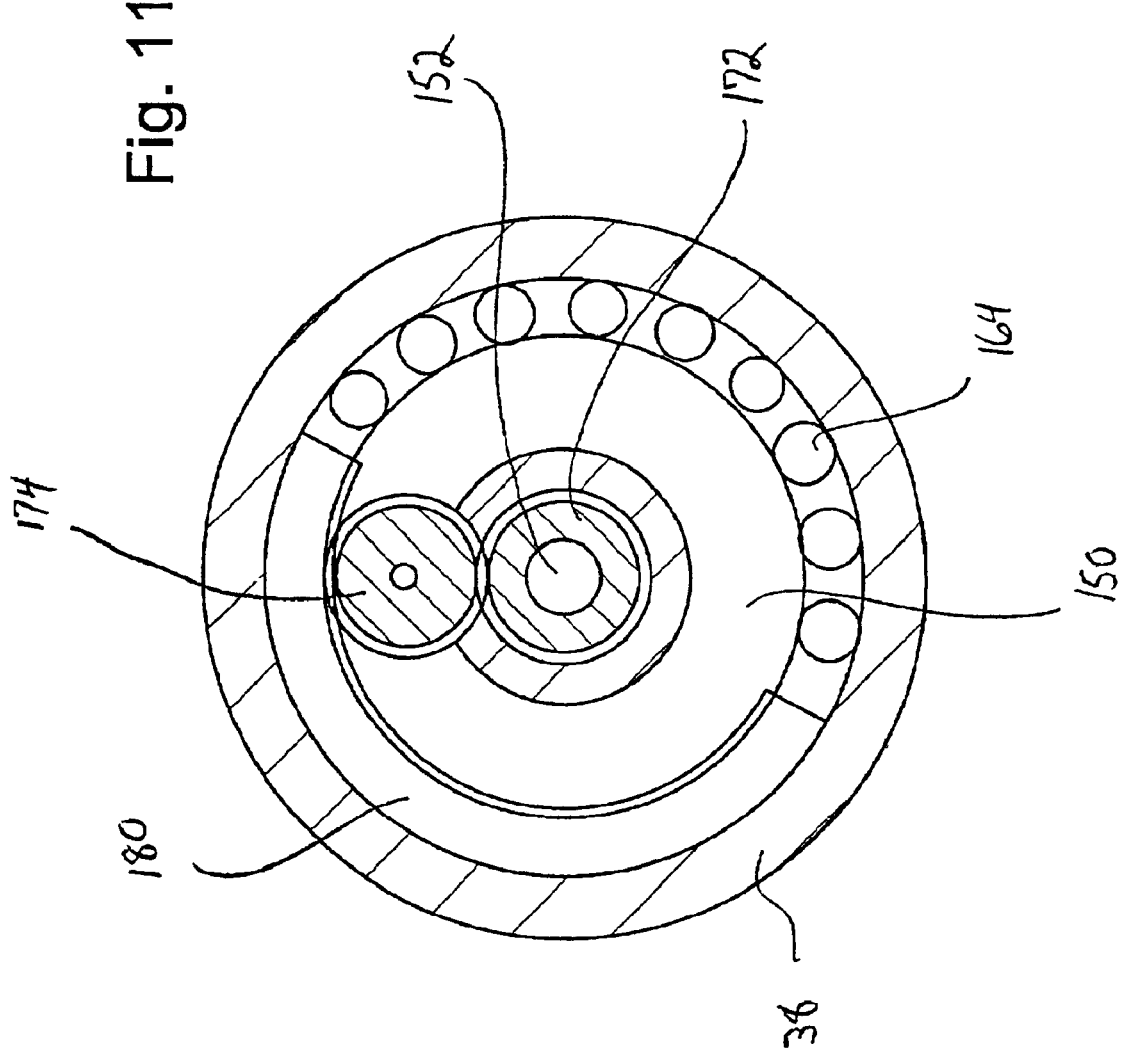

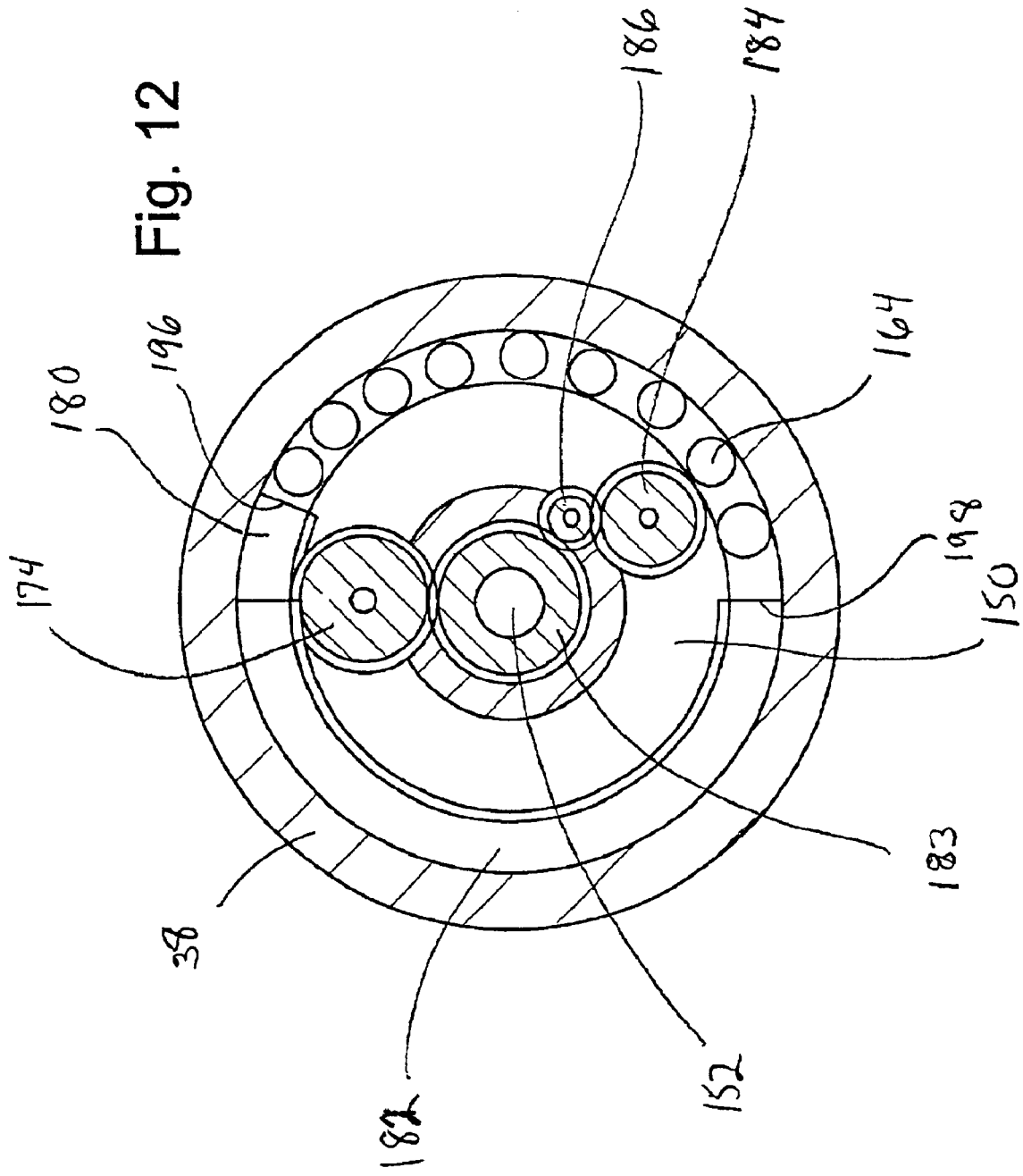

US 6,796,200 B2

MULTI SPEED BICYCLE TRANSMISSION INCLUDING ECCENTRIC CRANKING ASSEMBLY

BACKGROUND OF THE INVENTION

The invention generally relates to a transmission assembly for use in manually powering a device such as a bicycle. More particularly, the invention concerns a multispeed, gear-driven transmission bicycle transmission having a broad range of gear ratios making it suitable for operation in a wide variety of terrains. Moreover, the transmission includes an eccentric cranking mechanism which ergonomically takes advantage of the cranking power available from an individual.

Bicycle driving mechanisms are, of course, known in the prior art. For example, U.S. Pat. No. 628,184 which issued to Plass concerns a bicycle driving mechanism having a multigear transmission casing mounted in a frame which is vertically movable in the casing between the crank shaft and a second shaft. An operating rod raises or lowers the frame to the require position. Transmission gear wheels are fixed to upper, central, and lower shafts that, in turn, are journaled between to bars of the first frame. Movement of the second frame engages the alternate driving gear wheels and imparts motion to the mechanism.

It is also known to employ multiple gears of various diameters mounted on a frame in a bicycle transmission. A lever mounted on the frame carries a gear adapted to mesh with the gears of the pedal shaft. Multiple gears mounted on the frame transmit movement of the pedal shaft to the multiple gears mounted on an auxiliary frame. See U.S. Pat. No. 1,938,157.

A bicycle transmission having a steering lever provided with a number of levers connected to and operated by each other through suitable gearing is also known. The levers communicate with rotary movement to a connect a central shaft from which the axle is driven. See, U.S. Pat. No. 397,144.

A bicycle transmission with a shiftable gear drive arrangement combined with a chain to connect a rotary power input to the driven wheel is also known. A two-speed arrangement is illustrated. A lever slides a gear assembly between two different positions on a shaft to provide the two operating speeds. See, for example, British Patent No. 25,975.

Of course, drive gear transmissions are also generally known for use in a tricycle. Such a transmission can include an element constructed from a pair of gear wheels on a common shaft.

Other patents related generally to bicycle transmissions are also known, see, for example, U.S. Pat. Nos. 222,779; 283,697; 573,285; 668,784; 881,729; 1,332,709; 2,518,537; 2,687,897; 4,077,648; German 72,199; and French 541,261.

None of those known transmission assemblies however provide the broad range of gear ratios needed for current recreational and competitive cycling. Moreover, the known transmission assemblies do not take advantage of the enhanced driving power available from a cranking mechanism which is eccentrically positioned relative to the transmission input axis so as to ergonomically power the transmission.

OBJECTS AND SUMMARY OF THE INVENTION

A general object of the present invention is to provide a bicycle transmission having multiple gear ratios and providing a direct driving connection between a power input and the driven wheel.

A more particular object of the present invention is to provide a bicycle transmission having multiple gear ratio controls each providing multiple gear ratios so as to increase the range of gear ratio connections between the input shaft and the driven wheel of a bicycle.

A further object of the invention is the use of an eccentrically powered crank assembly in connection with a multispeed bicycle transmission. The eccentrically powered crank assembly is operative to make efficient use of the torque and power available from a person operating the bicycle.

A bicycle transmission which satisfies these and many other advantages includes a gear train connected to an over-running clutch on a driven wheel of a bicycle. The gear train of the transmission includes multiple gear shifting devices, each of which is capable of changing the gear ratio of the transmission through several speed changes determined by the ratios of the gears on the associated sprocket.

The gear shifting devices can include a shaft directly connected to a shaft carrying a spur gear in the transmission. By moving the shaft vertically upwardly, the associated spur gear moves between several different positions in driving relationship with portions of a corresponding sprocket, each of which corresponds to a different gear ratio. The shaft can also be manipulated to move the spur gear downwardly to reverse the gear ratio change by moving it laterally and pushing downwardly until the appropriate gear ratio is obtained.

The gear shifting device can also include corresponding cable pull arrangements attached to a corresponding spur gear in the transmission. By pulling up on the cable, the associated spur gear moves between several positions in driving relationship with a portion of the corresponding sprocket. By biasing the spur gear toward its initial, lowermost position, releasing tension on the corresponding cable allows the corresponding spur gear to move to the gear ratio associated with the lowermost sprocket position.

Another important part of the invention concerns the cranking mechanism used to power the direct-drive transmission. More particularly, the cranking mechanism is arranged to be eccentrically driven. This eccentric driving relationship is obtained through use of driven, telescoping cranks on either side of the bicycle, one for each foot. The telescoping cranks are driven to extend the radial distance between the cranking axis and the pedal during a forward portion of the pedal orbit and are also driven to reduce the radial distance between the cranking axis and the pedal during a return portion of the pedal orbit. In this manner, the pedals traverse a pedal orbit which is eccentric to the axis of the input to the bicycle transmission. Moreover, the pedal position uses the power available from leg extension to drive the bicycle transmission while minimizing the power input as the leg bends backwardly at the knee. Thus, an ergonomically arranged pedal cranking mechanism is provided.

BRIEF DESCRIPTION OF THE DRAWINGS

Many other objects and advantages of this invention will be apparent to those skilled in the art, when this specification is read in conjunction with the attached drawings, wherein like reference numerals are applied to like elements, and wherein:

FIG. 2 is a detailed view, in cross section, of the multi-speed, gear driven transmission of the present invention;

FIG. 3 is a cross-sectional view of the multi-speed, gear-driven transmission of the present invention taken along line 3—3 of FIG. 2;

FIG. 8 is a plan view of the pedal offset mechanism;

FIG. 9 is a cross-sectional view of the eccentrically offset pedal mechanism of the present invention taken along line 9—9 of FIG. 8;

FIG. 11 is an enlarged cross-sectional view taken along line 11—11 of FIG. 10;

FIG. 12 is an enlarged cross-sectional view taken along line 12—12 of FIG. 10;

DESCRIPTION OF THE PREFERRED EMBODIMENTS

Figure 1:
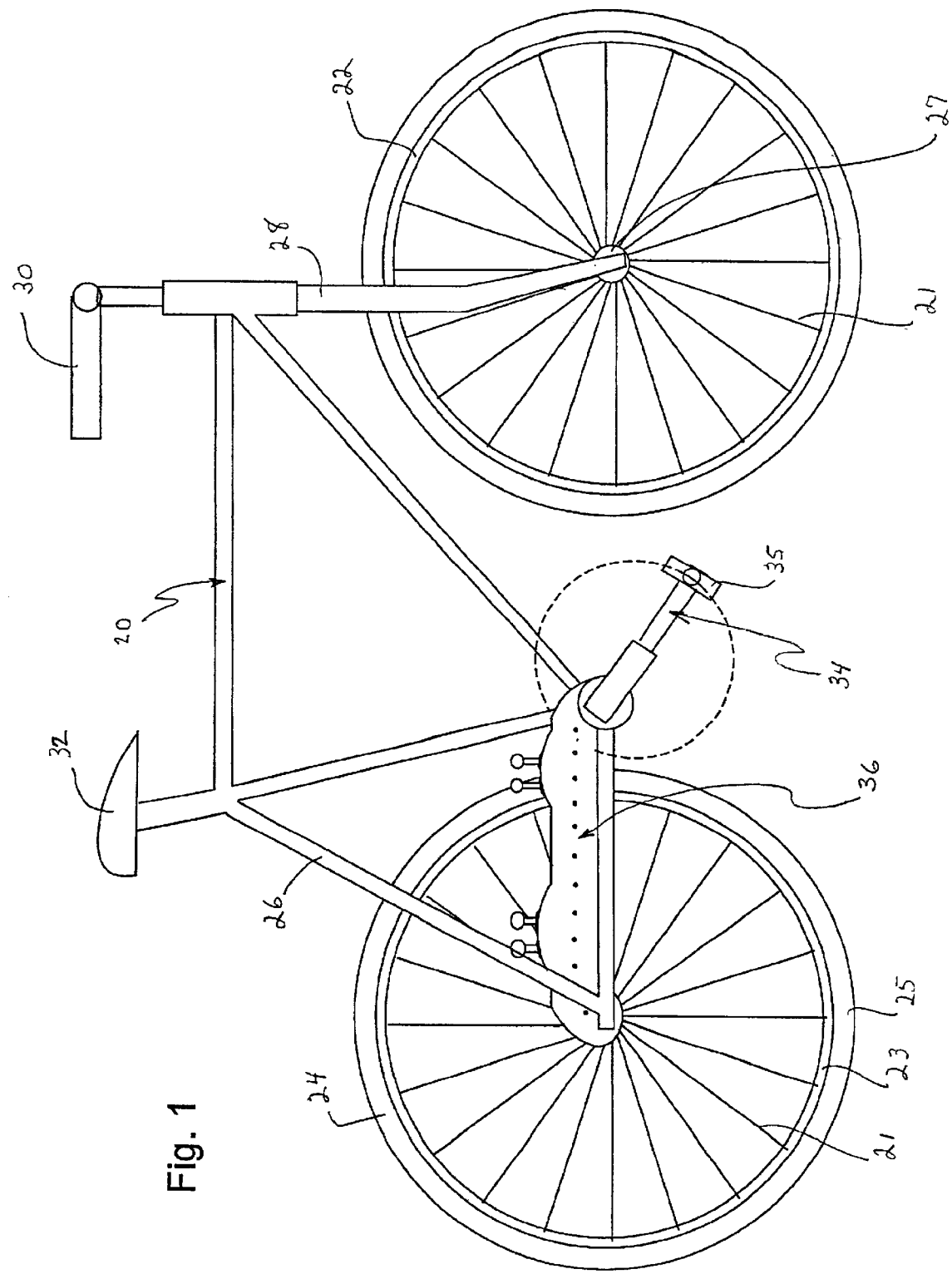
FIG. 1 is an overall view of a bicycle having the novel multi-speed, gear-driven transmission of the present invention.

A most preferred embodiment of the present invention is depicted in FIG. 1. A bicycle 20 has a front wheel 22 and a rear, or driven, wheel 24 both of which are supported on a frame 26. The frame 26 rotatably supports a fork assembly 28 through suitable conventional bearing at the front of the frame 26. To steer the bicycle assembly 20, suitable conventional handlebars 30 are provided which are directly connected to the fork assembly 28.

In a known manner, each wheel 22, 24 includes a plurality of spokes 21 which extend generally radially inwardly from the rim 23 which supports a balloon-type tire 25. At the center of each wheel assembly 22, 24 is a hub 27 carrying suitable conventional thrust bearings to reduce rolling friction of the bicycle assembly 22.

To support the operator on the frame 26, a suitable conventional seat 32 may be provided.

While the wheels 22, 24 have been described as begin supported by spokes 21, it will be apparent to those skilled in the art that there are other suitable support arrangements that have been used in bicycles in recent years. For example, the spokes 21 could be replaced by lightweight solid wheel disks extending from the hub to the rim.

The lower part of the frame 26 rotatably supports a cranking mechanism 34 having a pair of pedals 35 (only one of which is shown in FIG. 1. In its simplest configuration, the cranking mechanism 34 can be a suitable conventional crank supported in the frame 26 by suitable conventional thrust bearings and arranged to drive the transmission 36. However, as will be described more filly below, the preferred arrangement for the cranking mechanism is an eccentrically offset pedaling mechanism which is ergonomically designed to increase the torque available from the bicycle operator.

Extending between the cranking mechanism 34 and the hub of the rear wheel 24 is a multi-speed, gear-driven transmission assembly 36. This transmission assembly 36 permits the bicycle operator to select from as many as 81 different gear ratios for the power connection between the cranking mechanism 34 and the rear wheel 24.

As shown in the cross-sectional view of FIG. 2, the transmission assembly 36 includes a housing 38 to hold and protect the gears of the transmission. The housing 38 is designed so that it can be opened to expose the gears therein. The housing 38 can be arranged to open along a plane generally parallel to a plane defined by the frame 26 of the bicycle. Alternatively, the housing can be arranged so that access to the gears occurs along a plane transverse to the bicycle frame 26. Of course, any other desired arrangement can also be used for access to the gears for maintenance, assembly, and the like.

The transmission 36 also includes an input gear 40 at the front end of the housing 38 which is constructed and arranged to be operated by the cranking mechanism 34. In addition, the transmission assembly 36 includes an output gear 42 at back end of the housing 38 for driving connection with hub of the rear wheel. Between the input gear 40 and the output gear 42 are a plurality of different gears which are arranged to transmit power and torque therebetween while allowing for variable gear ratios. So that the cranking mechanism 34 and the rear wheel 24 turn in the same direction, it is necessary that there be an odd number of gears between the input gear 40 and the output gear 42. It will be appreciated by those skilled in the art that all gears in the transmission which mesh with one another have gear teeth with the same shape and configuration so that meshing can be accomplished. In addition, it will also be apparent to those skilled in the art that the diameter of any given gear surface is determined by the number of teeth in that gear surface. Suitable gears for use in this invention are stock steel gears made by Browning having 14.5° pressure angle, 3/16" face, and 32 pitch.

The input gear 40 may, for example, have 40 teeth and is connected to a first cone gear 44 by a first idler gear 46. The first idler gear 46 may also have 40 teeth so that the speed ratio across the input gear 40 and the first idler gear 46 is 1:1. The first cone gear 44 preferably includes three to five different gear surfaces so that three to five different gear ratios can be obtained. These different gear ratios can be obtained in several different ways. For example, the multiple gear ratios can be accomplished by casting a single gear with the desired different gear surfaces. Alternatively, the multiple gear surfaces can be obtained by building up the first cone gear 44 from a plurality of spur gears each of which has the desired diameter or number of gear teeth. Preferably, the first cone gear 44 has gear surfaces with 16 teeth, 20 teeth, 28 teeth, 32 teeth, and 40 teeth. It is also possible to use a simpler and less expensive arrangement of three gear surfaces with 16, 28, and 40 teeth. An objective in the gear teeth arrangement is to have at least one gear surface with 40 teeth so that the gear ratio leaving the first cone gear 44 is 1:1 with the input gear 40.

The transmission 36 also includes a second idler gear 48 which is rotatably mounted in the housing 38 and which is engaged by a first ratio-change assembly 50. The second idler gear 48 preferably has 56 teeth while the first ratio-change assembly 50 preferably has 32 teeth. Moreover, the second idler gear 48 has a thickness corresponding to the distance between the side walls of the transmission housing 38 (see FIG. 3). In this way, the first ratio-change assembly can be constantly engaged with the second idler gear 48 regardless of the lateral position of the first ratio-change assembly 50. The first ratio-change assembly 50 meshes with the second idler gear 48 and can be moved to mesh with each one of the different gear surfaces of the first cone gear 44.

The second idler gear 48 also meshes with a second ratio-change assembly 52. (See FIG. 2). The second ratio-change assembly 52 preferably has 56 teeth so that the speed ratio into the first ratio-change assembly 50 and out of the second ratio-change assembly 52 is 1:1. The second ratio-change assembly 52 is constructed and arranged in a similar fashion to the first ratio-change assembly 50.

The second ratio-change assembly 52 engages a second cone gear 54 having a plurality of gear surfaces. The second cone gear 54 can be constructed in the same manner as the first cone gear 44, and the gear surfaces are preferably arranged to have the same number of teeth as the first cone gear. As seen from FIG. 3, the second cone gear 54 may be arranged so that the largest gear is on the side of the housing opposite from the largest gear of the first cone gear 44. This arrangement permits more gear ratios to be obtained in the fixed space available between the cranking mechanism and the rear wheel. As with the first cone gear 44, the largest gear surface of the second cone gear 54 also has 40 teeth. In this fashion, a speed ratio of 1:1 between the input gear 40 and the second cone gear 54 can be obtained, depending upon the selection of the first and second ratio-change assemblies 50, 52.

The second cone gear 54 meshes with a third idler gear 56 which, in turn, meshes with a third cone gear 58. The third idler gear preferably has 64 teeth. This third cone gear 58 has its largest gear on the same side of the gear housing 38 as does the first cone gear 44. As with the first and second cone gears 44, 54, this third cone gear 58 includes a plurality of different gear surfaces so that different speeds can be obtained. Preferably, the gear surfaces have 40 teeth, 56 teeth, 64 teeth, 80 teeth, and 96 teeth. Importantly, the smallest gear surface should have 40 teeth so that a 1:1 gear ratio can be obtained between the input gear 40 and the exit of the third cone gear 58. By using gear surfaces with more than 40 teeth in the third cone gear, the third cone gear also permits operation at speed ratios less than 1:1 and as low as 1:0.42 between the input gear 40 and the exit from the third cone gear 58.

The third cone gear 58 meshes with a third ratio-change assembly 60 which can be moved to engage any of the different gear surfaces provided on the third cone gear 58. The third ratio-change assembly 60 meshes with a fourth idler gear 62 which, in turn, meshes with a fourth ratio-change assembly 64. Like the second idler gear 48, the fourth idler gear 62 extends between the sidewalls of the transmission housing 38 (see FIG. 3) so that the third ratio-change assembly 60 can be constantly meshed with the fourth idler gear 62 regardless of the lateral position of the third ratio-change assembly 60. The third ratio-change assembly 60 preferably has a gear surface with 64 teeth. The fourth idler gear 62 preferably has 32 teeth. And, the fourth ratio-change assembly 64 preferably has 64 teeth. With this arrangement, the speed ratio entering the third ratio-change assembly 60 (see FIG. 2) and leaving the fourth ratio-change assembly 64 is 1:1.

The fourth ratio-change assembly 64 meshes with a fourth cone gear 66. The fourth cone gear 66, like the other cone gears, has a plurality of different gear surfaces. Like the first and third cone gears 44, 58, the largest gear surface of the fourth cone gear 66 is located against the same side of the transmission housing 38. Moreover, the fourth cone gear 66 preferably has gear surfaces with the same numbers of teeth as the gear surfaces of the first and second cone gears 44, 54. Since one of the gear surfaces of the fourth cone gear 66 also has 40 teeth, the transmission assembly is capable of providing a 1:1 gear ratio between the input gear 40 and the exit of the fourth cone gear 66.

The fourth cone gear 66 meshes with a fifth idler gear 68 preferably having 56 teeth which, in turn, meshes with the output gear 42 preferably having 40 teeth. Accordingly, depending upon the position of the four ratio-change assemblies 50, 52, 60, and 64, a 1:1 speed ratio is available between the input gear 40 and the output gear 42.

However, if the third ratio-change assembly 58 is positioned to engage the largest gear surface of the third cone gear 58, while the first, second, and fourth ratio-change assemblies are positioned to give a 1:1 ratio, then the ratio of the input speed at input gear 40 to the output speed of the output gear 42 can be as low as 1:0.42, which is a very slow output speed. Conversely, if the third ratio-change assembly 58 is positioned to give a 1:1 ratio while the first ratio change assembly 44 is positioned to give its highest output speed, with the second and fourth ratio-change assemblies set at 1:1, then the ratio of the input speed of the input gear 40 to the output speed of the output gear 42 is 1:2.5. If the third ratio-change assembly 58 is positioned to give a 1:1 ratio while the first and second ratio-change assemblies are positioned to give their highest output speeds, while the fourth ratio-change assembly 66 remains at 1:1, then the ratio of input speed to output speed is 1:6.25. And finally, if the first, second, and fourth ratio-change assemblies 44, 52, 66 are positioned to give their highest output speeds, while the third ratio-change assembly is set at 1:1, then the ratio of input speed to output speed is 1:15.625.

The output gear 42 can receive a suitable conventional splined connection to the hub of the rear wheel of the bicycle. It will be noted that the cone gears illustrated in FIGS. 2 and 3 are depicted with three gear components. That arrangement has been selected, however, for clarity of illustration and is not to be taken as a limitation. These cone gears can be provided with additional gears to provide even more gear ratios—for example, five component gears are considered to be desirable.

Figure 4:
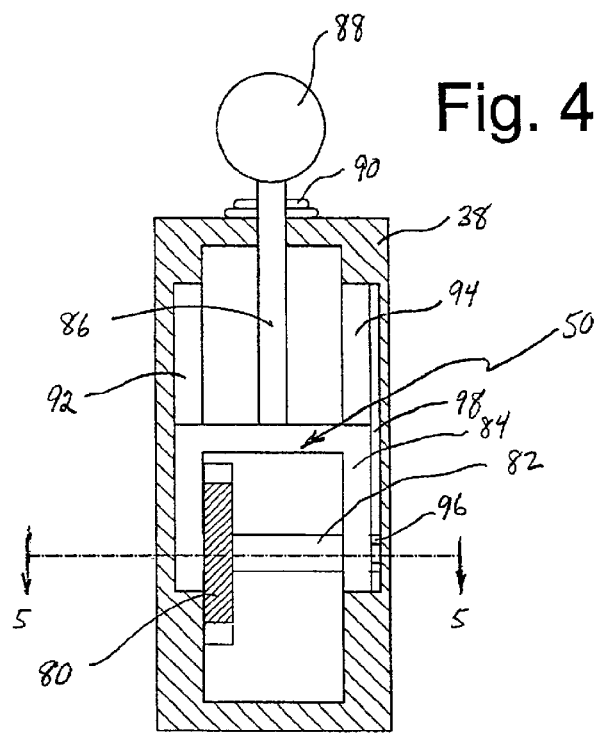
FIG. 4 is a cross-sectional view of a first embodiment of the ratio-change assembly taken along line 4—4 of FIG. 2.

Turning now to FIG. 4, a preferred embodiment of the gear ratio-change assembly 50 is illustrated. The other gear ratio-change assemblies 52, 60, 62 are similarly constructed and arranged so it will suffice to describe one of the gear ratio-change assemblies in detail. The gear ratio-change assembly 50 carries a gear 80 which is mounted on a corresponding shaft 82 by a suitable conventional bearing assembly such as, by way of example, a ball bearing. The outer race of the ball bearing is attached to the gear 80 while the inner race of the ball bearing is slidably mounted on the shaft 82 so that is can move from side to side within the transmission housing 38. Each end of the shaft 82 is fixed to a yoke 84 that is slidably mounted in corresponding grooves 92, 94 on each side of the housing 38. The grooves 92, 94 are arranged so that the center of the shaft 82 traverses the necessary path to properly position the gear 80 so that it meshes with the corresponding gear surfaces of the first cone gear while maintaining engagement with the second idler gear 48. More particularly, the grooves 92, 94 are arcuate and are centered on the axis of the second idler gear 48.

The yoke 84 is operated by a rod 86 which projects through the top of the housing 38 so as to be operable by the rider of the bicycle. The upper end of the rod 86 may, preferably, include a knob 88 to make its operation easier. To prevent dust, dirt, moisture, and other foreign substances from entering the transmission, a suitable conventional boot 90 is provided about the rod 86 at the entrance to the housing 38. The boot 90 is secured to the housing 38 and engages the rod 86 so that the rod 86 is slidable therein.

Figure 6:
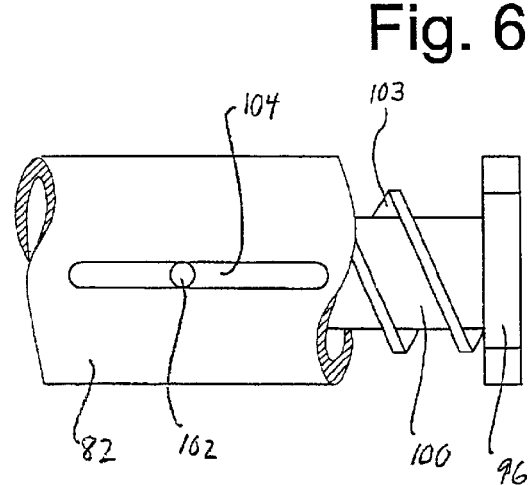
FIG. 6 is an enlarged schematic view of a mechanism for laterally translating the shift gear.

To move the gear 80 laterally from one gear surface of the first cone gear to another gear surface thereof, the inner race of the bearing carries a pin 102 (see FIG. 6), which projects into a slot 104 of the shaft 82. Within the shaft 82 is a worm gear 100 which carries one or ore worm threads 103. The pin 102 of the bearing projects into the space between the worm threads 103 so that, as the worm gear 100 rotates, the pin 102 and the associated inner race of the ball bearing will move laterally along the shaft 82. Thus, as the inner race of the bearing moves, so does the outer race and the gear 80 attached thereto.

Figure 5:
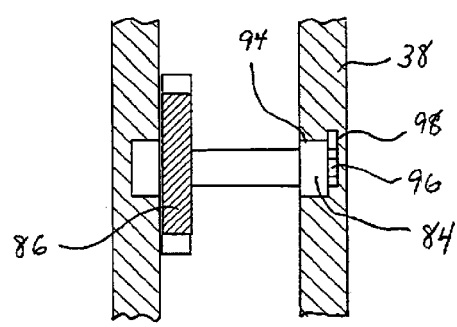
FIG. 5 is a cross-sectional view taken along line 5—5 of FIG. 4.

To rotate the worm 100, the end of the worm is provided with a worm pinion 96. The worm pinion meshes with a gear rack 98 positioned at one side of the groove 94 in the housing 38 (see FIG. 5). Accordingly, when the yoke 84 moves upwardly or downwardly in the associated grooves 92, 94 of the housing 38, the gear rack 98 causes the worm pinion 96 to rotate. Thus, the worm gear 100 rotates moving the pin 102 and the gear 80 laterally between positions where it can engage various gear surfaces of the corresponding cone gear.

While a worm gear cooperating with a pin carried by the inner bearing race have been described as a mechanism to move the gear 80 laterally, it will be apparent to those skilled in the art that there are a variety of other mechanisms which can provide similar control. For example, a cam surface on a shaft can replace the worm gear and offer more varied control over the lateral movement of the gear. More particularly, with a worm gear the lateral movement would be linear with rotation of the worm gear 100; whereas, with a cam and follower arrangement, the cam could prove nonlinear positional changes for the gear 80 as well as different linear rates of displacement which could prove useful during gear engagement and disengagement.

Suitable conventional detent mechanisms can be provided to engage the yoke 84 and hold it in appropriate positions to engage the various gear surfaces of the cone gear. Such detent mechanisms may comprise, for example, spring-loaded balls carried by the yoke 84 which engage corresponding recesses of the housing grooves 92, 94. Alternatively, the detent balls could be in the housing while the detent recesses are provided in the yoke 84. Yet another arrangement may comprise a detent mechanism between the operating rod 86 and the housing 38.

Figure 7:
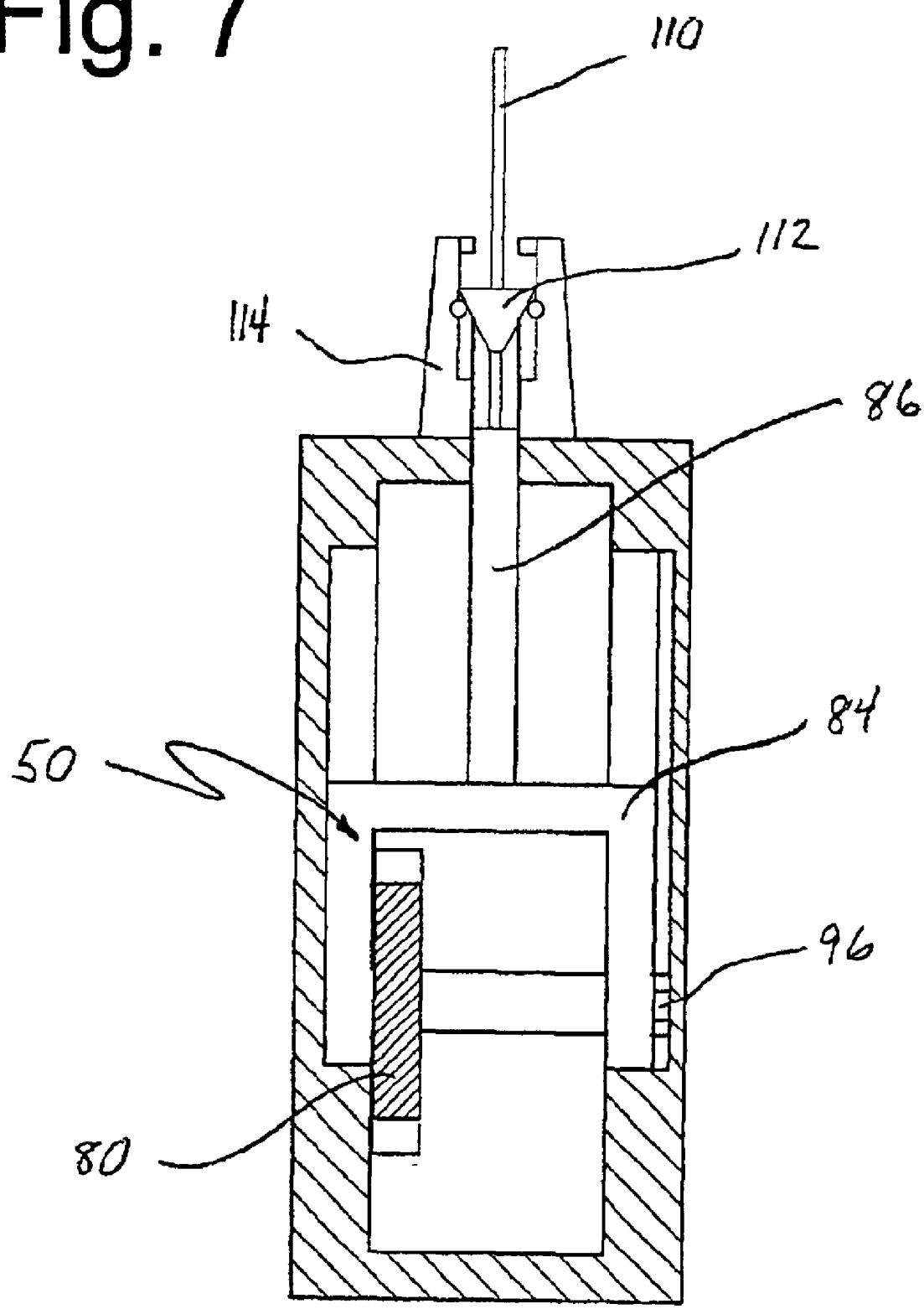
FIG. 7 is a cross-sectional view of a second embodiment of the ratio-change assembly.

It is also within the scope of this invention to provide a cable operated control for the gear ratio-change assembly 50. See FIG. 7. For example, the free end of the rod 86 which moves the yoke 84 may be attached to one end of a cable 110. Suitable conventional cables 110 are the type often used in bicycles and may be braided stainless steel cables. The other end of the cable 110 is preferably positioned where the bicycle operator has easy access. Sometimes, for example, the second end of the cable 110 may be located on the cross-bar of the bicycle frame assembly where the operator can reach it quickly and efficiently.

With this alternative embodiment, a suitable conventional spring ball detent mechanism 112 may be provided which is operated by the cable 110. The spring ball detent mechanism cooperates with and engages a collar 114 which is then securely mounted on the top of the housing 38 so as to surround the cable 110. In addition, if desired, a boot may be used to keep dust, dirt, moisture, and other foreign matter out of the transmission.

Figure 13:
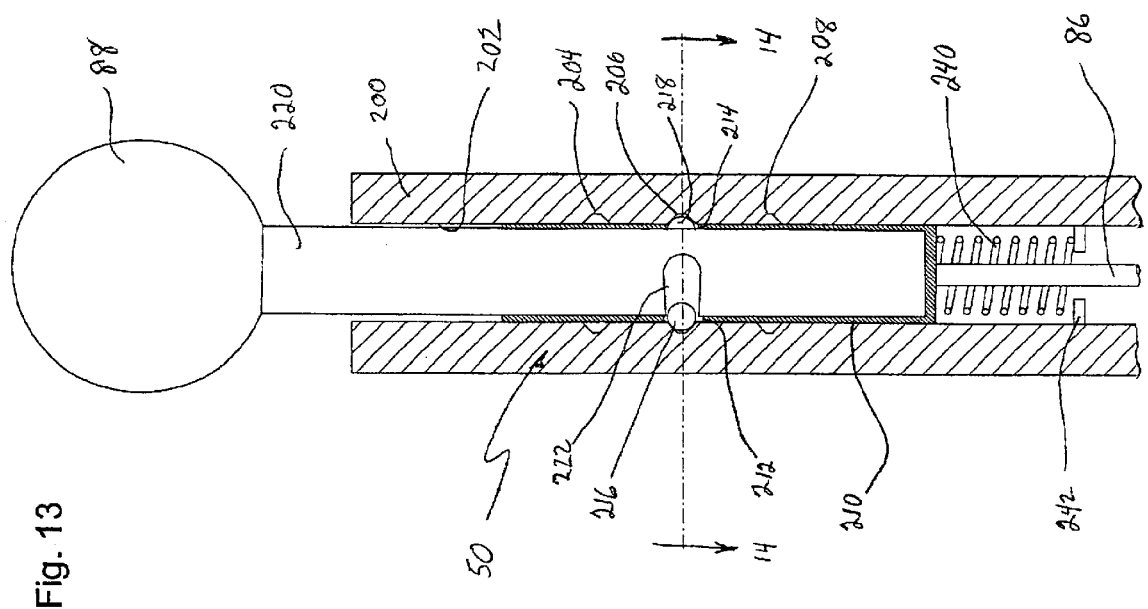
FIG. 13 is an alternative embodiment of the mechanism for laterally shifting the change gear.

Turning now to FIG. 13, an alternative embodiment is provided for the shifting mechanism. An extension collar 200 is attached to the transmission housing 38. The collar has an internal opening 202 which preferably is a generally circular bore. The internal opening 202 has a plurality of radially outwardly extending recesses 202, 204, 206 which are generally trapezoidal in cross section. The recesses 202, 204, 206 are axially spaced to correspond to the shift positions for the associated shift gear of the transmission. While three recesses are shown, it is understood that there would be one recess for each different position of the associated shift gear.

Figure 14:
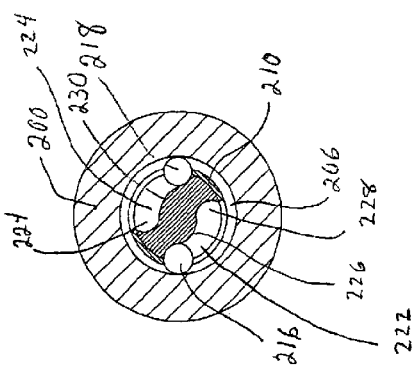
FIG. 14 is a cross-sectional view taken along the line 14—14 of FIG. 13.

Slidably mounted within the opening 202 for axial movement along the opening is a sleeve 210. The lower end of the sleeve 210 may be closed, as illustrated, and is attached to the member 86 that, in turn, is connected to the associated shift gear. Positioned between the ends of the sleeve 210 are a pair of lateral ports 212, 214. These lateral ports are diametrically opposed to one another, preferably. Moreover, the lateral ports 212, 214 are sized to permit free movement of corresponding detent balls 216, 218. Slidably disposed within the sleeve 210 is a shaft 220 having the shift knob 88 attached at one end. The shaft 220 has a pair of circumferentially extending slots 222, 224 (see FIG. 14) which are diametrically opposed to one another. The circumferential extent of the slots 222, 224 is approximately 90°. Furthermore, one end 228, 230 of each slot 222, 224 is deeper than the other end each of each slot. The depth of these ends 228, 230 is sufficient to allow the associated detent ball 216, 218 to move radially inwardly toward the axis of the shaft 220 to a position where the detent balls 216, 218 are fully disengaged from any circumferential recess, e.g. 206. The depth of the other end of these slots 222, 224 is selected so that the detent balls 216, 218 protrude radially outwardly from the axis of the shaft 220 so that the detent balls are received in a circumferential recess, e.g. 206. As a result, as the knob 88 is rotated in one direction, e.g., clockwise, the detent balls 216, 218 are forced radially outwardly by the cam surfaces 226, 228 extending between the deep ends 228, 230 of the slots 222, 224 and the shallow ends of those slots, thereby axially fixing the position of the shaft 220 relative to the collar 200. Correspondingly, as the knob 88 is rotated the opposite direction, e.g., counterclockwise, the detent balls 216, 218 can move radially inwardly thereby allowing the shaft 220 to move axially relative to the collar 200.

To bias the sleeve 210 so that it will move between shift positions corresponding to the position of the circumferential grooves 204, 206, 208, a compression spring 240 may be used. One end of the spring 240 abuts a support element 242 carried by the collar 200. The other end of the spring 240 bears upon the end of the sleeve 210. Accordingly, when the knob 88 is rotated to its first position to release the detent balls 216, 218, the spring 240 pushes the sleeve 210, the shaft 220, and the knob 88 upwardly pulling the associated shift gear at the same time. When the new gear position is reached, the knob 88 is rotated to its second position where the detent balls 216, 218 engage another circumferential recess of the opening 202, thereby securing the assembly in the new shift position.

With reference now to FIG. 8, the eccentric pedal crank mechanism 34 is illustrated. The eccentric crank mechanism 34 is rotatably supported on the frame of the bicycle by the generally cylindrical housing 120 located at the bottom of the frame. Suitable conventional thrust bearings are provided on both sides of the housing 120 to support the crank mechanism with low friction. The crank assembly 34 includes a pair of fixed arms 122, 124, each of which receives a corresponding telescopic pedal arm 126, 128. At the distal end of each telescopic pedal arm 126, 128 is a suitable conventional pedal 35 which is rotatably mounted on a pedal shaft 35'.

Both telescopic pedal arms 126, 128 are identical so it will suffice to describe the details of one, it being understood that the details of the other are identical. The pedal arm 128 is slidably mounted within the fixed arm 124. Preferably, a pair of suitable, conventional linear ball bearing assemblies 136, 138 are provided to support the telescopic pedal arm 128 within the fixed arm 124. (See FIG. 9). One linear bearing assembly is provided on the top of the telescopic pedal arm 128, while the other linear bearing assembly 138 is provided on the bottom of the telescopic pedal arm 128.

Preferably, each telescopic pedal arm 128 includes a longitudinally extending channel 130 on the side opposite the pedal 35. Ends of the channel 130 may be rounded as illustrated. One longitudinal edge 132 of the channel 130 is provided with a rack gear surface. The rack gear schematically shown at 137 may be integrally formed with the telescopic pedal arm 128 or it may be securely attached to the pedal arm 128 within the channel 130. While it is preferred to include the rack gear surface in the channel 130, it is within the scope of this invention to mount the rack on the side of the telescopic pedal arm 128. Such an external mount, however, may expose the rack gear surface to damage during use, than does the protected arrangement of the channel 130.

A pedal pinion 134 engages and meshes with the rack gear surface 132 of the telescopic pedal arm 128. It can be seen from FIG. 9 that there is a clearance between the circumference of the pedal pinion 134 and the channel 130 opposite to the gear rack surface 132. That clearance is intentional and assures that there is no interference with free rotation of the pedal pinion 134. The pedal pinion 134 is operable to rotate in two opposite directions. As the pedal pinion 134 rotates in a first direction, the telescopic pedal arm 128 is driven outwardly by the meshed gear rack surface 132 and the gear teeth on the pedal pinion 134 so that the pedal moves away from the fixed arm 124. As the pedal pinion 134 rotates in a second direction, the telescopic arm 128 is driven inwardly so that the pedal moves toward the fixed arm 124. With this arrangement, the pedals 35 move through an arc which is eccentrically positioned relative to the axis of the housing 120 (see FIG. 1). Thus, the pedals 35 move so that greater torque is applied to the pedal crank assembly 34 than would be available from a conventional assembly having fixed length pedal arms. Moreover, the telescopic pedal arms 126, 128 operate to provide greater ground clearance under the crank assembly than exists with fixed length pedal arms.

Figure 10:
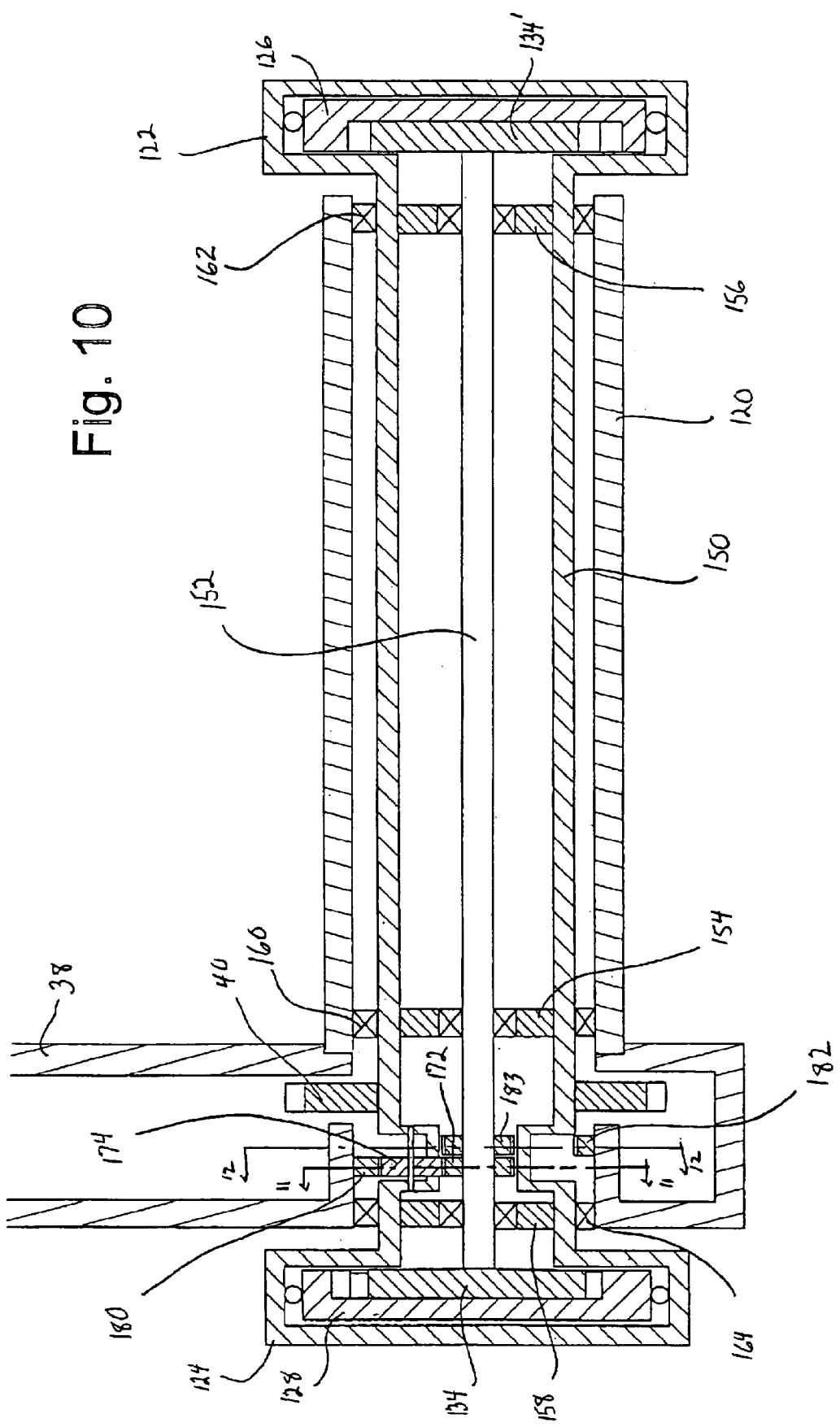
FIG. 10 is a detailed, cross-sectional view taken along line 10—10 of FIG. 8.

The coordinated movement of the oppositely disposed telescopic pedal arms 126, 128 is explained more easily with reference to FIG. 10. The fixed arms 122, 124 are rigidly connected to a main shaft 150 which extends through the housing 120 and which engages and drives the input gear 40 of the transmission assembly 38. Thus, as the pedals are actuated by the bicycle operator, rotary movement of the fixed arms 122, 124 and the connecting shaft 150 drive the transmission and, ultimately, the rear wheel of the bicycle.

A pedal pinion 134, 134' is provided for each pedal arm 126, 128. The two pedal pinions 134, 134' are connected by a shaft 152 which extends through the interior of the main drive shaft 150. The shaft 152 is rotatably mounted in bearing blocks 154, 156 positioned so as to be in proximity to the ends of the housing 120 and coaxial within the main drive shaft 150. The bearing blocks 154, 156 are attached to the interior surface of the drive shaft 150 and rotatably support the pedal pinion shaft 152. In addition, a third bearing block 158 is positioned adjacent to the outside of the transmission housing 38. This third bearing block 158 also rotatably supports the pinion shaft 152 relative to the main drive shaft 150 such that the bicycle transmission is disposed between the third bearing block 158 and one of the other bearing blocks 154. Each of the bearing blocks 154, 156, 158 may have a suitable conventional antifriction bearing, such as a ball bearing or a roller bearing, to rotatably support the pinion shaft 152 with a low friction device.

The drive shaft 150, in turn, is supported relative to the transmission housing 38 and the bicycle frame by antifriction bearings 160, 162, 164. These antifriction bearings may be ball bearings, roller bearings, or the like, and are positioned to be generally at the same axial position along the drive shaft 150 as are the bearing blocks 154, 156, 158. In this manner, bending stresses on the drive shaft 150 can be reduced. As seen in FIG. 10, the drive shaft 150 is radially centered in the housing 120, and the pinion shaft 152 is coaxial therewith.

To move the telescopic pedal arms 126, 128 relatively to the fixed portions 122, 124, the pinion shaft 152 is arranged to be driven in alternate rotational directions. To this end, the pinion shaft 152 is drivingly attached to a first reversing gear 172 (see FIG. 11) which meshes with a second reversing gear 174 having the same diameter and number of teeth. The second reversing gear 174 is rotatably carried by the drive shaft 150 so as to be in constant meshed relationship with the first reversing gear 172.

Positioned radially outwardly from the first and second reversing gears 172, 174, are a pair of axially offset, arcuate, gear segments 180, 182 (see FIG. 10). These gear segments 180, 182 have a thickness which is less than half the axial length of the reversing gears 172, 174 so that the gear segments 180, 182 can be circumferentially positioned relative to one another so as to alternately engage the reversing gears 172, 174. The engagement of the first reversing gear 172 with its corresponding arcuate gear segment 180 is illustrated in FIG. 11. The alternate engagement of the reversing gears 172, 174 with the corresponding gear segments 180, 182 causes the pinion shaft 152 to rotate in alternate directions depending upon which of the reversing gears 172, 174 is engaged with the corresponding gear segment 180, 182. The alternate rotation of the pinion shaft 152 causes the pinions 134, 134' to rotate in alternative directions thereby driving the telescopic arms 126, 128 in and out as the pedals rotate to drive the transmission.

Operation of the second reversing gear 183 and the corresponding arcuate gear 182 is more easily understood from FIG. 12. The drive shaft 150 carries a second pinion 184 which is radially positioned to be engageable with the second arcuate gear 182. The second pinion 184 also meshes with an idler gear 185 that, in turn, meshes with the second reversing gear 183. The reversing gears 172, 183 are fixed to the pinion shaft 152 so as to rotate therewith. Suitable conventional keys, splines, interference fits, or the like may be used to prevent rotation of the reversing gears 172, 183 relative to the pinion shaft 152.

The pinions 174, 184, 186 are rotatably mounted on the main drive shaft. As see in FIG. 10, these gears may be mounted in an annular recess in the drive shaft 150. Suitable openings are provided so that these gears can be in meshed relationship with the gears 172, 183 mounted to the pinion shaft 152.

It will be seen from FIG. 12, that the pinions 174, 184 are not necessarily of the same diameter. Such a diameter difference permits these pinions to engage the corresponding arcuate gears 180, 182 at different circumferential locations. However, the pitch and size of the gear teeth provide on the pinions 174, 184 and the corresponding arcuate gears 180, 182 must be appropriately coordinated so that the pinion shaft 152 rotates in one direction through the same angular displacement as it rotates in the opposite direction.

Preferably, the arcuate gears 180, 182 subtend an arc of about 180°. The angular positions of these arcuate gears 180, 182 relative to one another is determined by the angular spacing between the pinions 174, 184 about the axis of the pinion shaft 152. The leading edge 196 of the arcuate gear 180 is positioned to engage the pinion 174 just as the other pinion 184 leaves the trailing edge 198 of the second arcuate gear 182. The leading edge of the second arcuate gear 182 is similarly positioned relative to the trailing edge of the first arcuate gear 180. In this manner, one of the pinions 184, 184 is in driving engagement with its corresponding arcuate gear 180, 182 throughout the movement of the arrangement for telescopic motion of the arms.

More particularly, the arcuate gears 180, 182 are spatially fixed relative to the bicycle frame and transmission housing. Accordingly, as the main drive shaft 150 turns, it carries the pinions 174, 184, and idling gear 186. The pinions 174, 184, alternately engage the respective arcuate gears 180, 182 and are caused to rotate as their respective shafts orbit about the centerline of the drive shaft 150. Since the pinions 174, 184 rotate during different parts of the rotation of the main drive shaft 150, the pinions alternately drive the pinion shaft 152 in different rotational directions. Thus, the gears 134, 134' at opposite ends of the pinion shaft 152 rotate in opposite directions to move the pedal arms in and out.

Naturally, the various gear diameters, pitch and tooth shape can be adjusted by those skilled in the art to adjust the length of travel for the pedal arms to a predetermined, desired value.

Many objects and advantages of the present invention will be apparent to those skilled in the art when this specification is read in conjunction with the appended claims. The embodiments of the invention described above are to be considered as exemplary and not limiting. Moreover, many modifications, variations, and equivalents for the various features and elements of the invention will be apparent to those skilled in the art. The appended claims are intended to cover the preferred embodiments discussed in the specification as well as all legal equivalents of the elements discussed herein.

What is claimed is:

1. A bicycle transmission comprising:
   a transmission housing;
   an input gear rotatably mounted within the transmission housing;
   a first cone gear having a plurality of gear surfaces, supported by the transmission housing, driven by the input gear, one of the gear surfaces providing a 1:1 output speed ratio with the input gear, and the other gear surfaces provide output speed ratios less than 1:1 with the input gear;
   a first ratio-change assembly supported by the transmission housing, operable to selectively engage one of the gear surfaces of the first cone gear;
   a second cone gear having a plurality of gear surfaces, supported by the transmission housing, driven by the input gear, one of the gear surfaces providing a 1:1 output speed ratio with the input gear, and the other gear surfaces providing output speed ratios greater than 1:1 with the input gear;
   a second ratio-change assembly supported by the transmission housing, operable to connect the input gear with one of the gear surfaces of the second cone gear;
   an output gear rotatably mounted within the transmission housing, driven by the input gear through the first cone gear, the first ratio-change assembly, the second cone gear, and the second ratio-change assembly; and
   a telescopic pedal assembly operably connected to the input gear to drive the input gear, having
      a pair of fixed arms,
      a pair of telescopic arms, each telescopic arm being slidably mounted in a corresponding one of the fixed arms,
      driving means for moving the telescopic arms between an extended position and a retracted position one during each revolution of the pedal assembly, and
      a pedal carried at the distal end of each telescopic arm for rotating the pedal assembly.

2. The bicycle transmission of claim 1 further including:
   a third cone gear between the input gear and the output gear, having a plurality of gear surfaces, supported by the transmission housing, driven by the input gear, one of the gear surfaces providing a 1:1 output speed ratio with the input gear, and the other gear surfaces provide output speed ratios less than 1:1 with the input gear; and
   a third ratio-change assembly between the input gear and the output gear, supported by the transmission housing, operable to selectively engage one of the gear surfaces of the third cone gear.

3. The bicycle transmission of claim 2 further including:
   a fourth cone gear between the input gear and the output gear, having a plurality of gear surfaces, supported by the transmission housing, driven by the input gear, one of the gear surfaces providing a 1:1 output speed ratio with the input gear, and the other gear surfaces provide output speed ratios less than 1:1 with the input gear;
   a fourth ratio-change assembly between the input gear and the output gear, supported by the transmission housing, operable to connect the input gear with one of the gear surfaces of the fourth cone gear.

4. The bicycle transmission of claim 1 wherein the first ratio-change assembly comprises:
   a first gear surface;
   means for moving the first gear surface in a generally vertical direction, rotatably supporting the first gear surface, and guided by the transmission housing;
   means for moving the first gear surface in the generally horizontal direction;
   wherein the means for moving the first gear surface in the generally vertical direction and the means for moving the first gear surface in a generally horizontal direction cooperate to move the first gear surface to engage each of the plurality of gear surfaces of the first cone gear.

5. The bicycle transmission of claim 4 wherein the means for moving the first gear surface in the generally vertical direction includes a longitudinally translatable rod.

6. The bicycle transmission of claim 4 wherein the means for moving the first gear surface in the generally vertical direction includes a cable.

7. The bicycle transmission of claim 4 wherein the means for moving the first gear surface in the generally horizontal direction includes:
   a worm gear;
   a worm pinion carried by the worm gear;
   a rack surface carried by the transmission housing and engaged by the worm gear; and
   means for constraining the first gear surface to move longitudinally along the worm gear as the worm gear rotates.

* * * * *